Aug. 16, 1966 E. J. DIEBOLD 3,267,290

SERIES CONNECTED CONTROLLED RECTIFIERS FIRED
BY PARTICULAR-PULSE GENERATING CIRCUIT

Filed Nov. 5, 1962 4 Sheets-Sheet 1

INVENTOR.
EDWARD J. DIEBOLD

BY

OSTROLENK, FABER, GERB & SOFFEN

ATTORNEYS

INVENTOR.
EDWARD J. DIEBOLD
BY
OSTROLENK, FABER, GERB & SOFFEN
ATTORNEYS

INVENTOR
EDWARD J. DIEBOLD

BY

OSTROLENK, FABER, GERB & SOFFEN
ATTORNEYS

INVENTOR
EDWARD J. DIEBOLD
BY
OSTROLENK, FABER, GERB & SOFFEN
ATTORNEYS

United States Patent Office 3,267,290
Patented August 16, 1966

3,267,290

SERIES CONNECTED CONTROLLED RECTIFIERS FIRED BY PARTICULAR-PULSE GENERATING CIRCUIT

Edward J. Diebold, Palos Verdes Estates, Calif., assignor to International Rectifier Corporation, El Segundo, Calif., a corporation of California Filed Nov. 5, 1962, Ser. No. 235,318
19 Claims. (Cl. 307—88.5)

This invention relates to very high voltage controlled rectifier systems, and more specifically relates to a novel firing system for very high voltage controlled rectifier systems which have peak reverse and peak forward voltage ratings in excess of 10,000 volts, and would typically be in the order of 50,000 to 60,000 volts.

In order to obtain a very high voltage controlled rectifier system, the same practices used in obtaining high voltage rectifier systems are utilized wherein individual controlled rectifiers are connected in series.

Controlled rectifiers are presently readily available which have normal voltage ratings of several hundred volts, while special units are available which have ratings in the order of 1,000 volts. Where a system is required to have an output voltage rating of more than 10,000 volts maximum peak reverse voltage and peak forward voltage ratings, it is necessary to connect at least ten such units in series.

Where lower voltage rated individual units are used, or where a higher output voltage is required, obviously, more than ten series elements would be required. At the present time, many applications require several hundreds of series connected controlled rectifiers. When connecting such controlled rectifiers in series, many of the problems faced in connecting a large number of normal rectifiers in series reoccur, and the same solutions to these well known problems may be used.

By way of example, it is necessary to divide reverse steady state voltage and transient reverse voltages between the anode and cathode circuits of each of the elements. To this end, the usual parallel connected resistor and capacitor for each element may be directly used in the controlled rectifier-type system, as has always been used in the normal rectifier system.

In the case of the controlled rectifier system, the resistor-capacitor protective scheme will also act in the forward direction, as is required.

In the controlled rectifier circuit, however, a serious additional problem is faced of simultaneously turning on all of the controlled rectifiers. In the event that all of the rectifiers do not turn on at the same time, it will be apparent that the full line voltage will be applied to the last unit to turn on where this exceptionally high voltage may be sufficient to destroy the element. During the next operation, a different of the controlled rectifiers will turn on last and, in turn, will be destroyed, with the complete chain of series connected elements eventually failing in this manner.

Where only a few controlled rectifiers are connected in series (up to a maximum of about ten series connected elements), it is possible to use sympathetic firing circuits of the type described in my copending application Ser. No. 214,003, filed August 1, 1962, now Patent No. 3,226,625, entitled Series Connection of Controlled Semi-Conductor Rectifiers and assigned to the assignee of the instant invention. In this type of circuit, the break-down of any one controlled rectifier in the series string forces an overvoltage on both the gate and anode of the remaining unfired controlled rectifiers in the string to force "turn-on" of these latter elements.

While this system works satisfactorily where only a few controlled rectifiers are utilized, when a very large number of controlled rectifiers are connected in series, the cumulative voltage on the last devices which are broken down by an extremely rapidly rising voltage having a very high magnitude will cause their puncture and ultimate destruction.

It is for this reason that only a few series connected devices, typically 5 or 6, can be used with the sympathetic firing circuit where rate of rise of voltage is not quite so great as in a system having voltage ratings sufficiently high to require more than 5 or 10 controlled rectifiers in series.

The principle of the present invention is to provide a novel control circuit for simultaneously turning on a plurality of controlled rectifiers in which a very high, very short pulse of current is applied to the gate which, in combination with the normally used balancing capacitors, will cause the complete chain to operate as a single controlled rectifier.

More specifically, and in accordance with the invention, a controlled current pulse is applied to the gate which has a magnitude of the order of 100 to 1,000 times the magnitude required to turn the unit on, and has a duration which is of the order of $\frac{1}{10}$ the time required for the unit to turn on.

In combination with this type pulse, parallel connected capacitor means are provided for the anode-cathode circuit of each of the controlled units which insures a source of anode to cathode carriers during the turn-on interval to rigidly maintain a constant voltage across the individual controlled rectifiers during the turn-on period.

This constant voltage is, because of the characteristics of the parallel connected capacitor and gate pulse, substantially rigidly held for a time long enough to allow the entire string of units to be turned on. Therefore, it is impossible for excessive voltage to be applied to any one of the units on the line.

Moreover, the capacitor-resistor circuit forces high magnitude currents through the anode circuit of a controlled rectifier being turned on to accelerate the turn-on process.

It has been found that the specific values required of the capacitor and resistor in the shunt circuit of each of the controlled rectifiers will be satisfied where the capacitor and resistor are designed for normal voltage balancing operation for balancing steady state voltages and transient voltages over the entire string.

The novel invention further includes the provision of highly desirable pulse generation circuits for generating the novel pulse on the gate of a controlled rectifier, as well as pulse generation circuits for use in low frequency applications of the controlled rectifier system.

Moreover, the novel invention contemplates the novel arrangement of the circuit elements in modular form so that the assembly can be formed of a plurality of series of modules in the fashion of my copending application Serial No. 56,592, filed Septembr 16, 1960, now abandoned, entitled Photovoltaic Cell Having Controlled Characteristics and assigned to the assignee of the present invention.

Accordingly, a primary object of this invention is to permit the series connection of in excess of 10 controlled rectifiers by holding the voltage across the units constant during turn-on of the units.

Another object of this invention is to provide a novel firing circuit for firing a plurality of controlled rectifiers.

A further object of this invention is to provide a novel firing circuit for permitting a large number of series connected controlled rectifiers for applications in excess of 10,000 volts output.

A further object of this invention is to provide a novel firing pulse in combination with a parallel resistor-capacitor circuit for each controlled rectifier of a system of series connected controlled rectifiers.

Another object of this invention is to provide a novel pulse circuit.

A further object of this invention is to provide a novel pulse circuit which generates a pulse specifically adapted for firing controlled rectifiers.

A further object of this invention is to provide a novel electrical circuit for distributing a pulse between a plurality of controlled rectifiers.

A further object of this invention is to provide a novel system for arranging a plurality of series connected controlled rectifiers and their respective control circuit components in modular form.

Yet another object of this invention is to provide a novel modular arrangement of series connected controlled rectifiers for low frequency applications.

A still further object of this invention is to provide a novel pulse generating circuit in which the pulse fires through a controlled rectifier after a predetermined delay after turn-on of the controlled rectifier.

These and other objects of this invention will become apparent from the following description when taken in connection with the drawings, in which.

Figure 3:
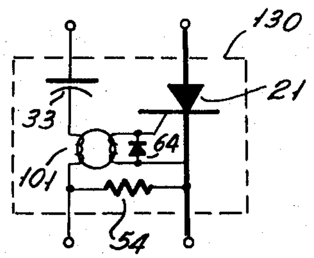
FIGURE 3 illustrates the manner in which the controlled rectifiers of FIGURE 2, along with its respective control circuitry, can be arranged for modular support.
Figure 4:
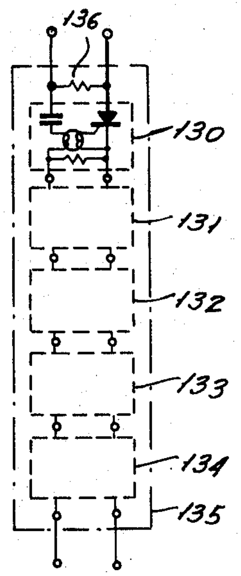

FIGURE 4 schematically illustrates the manner in which a plurality of modules of the type shown in FIGURE 3 are arranged with respect to one another.

Figure 5:
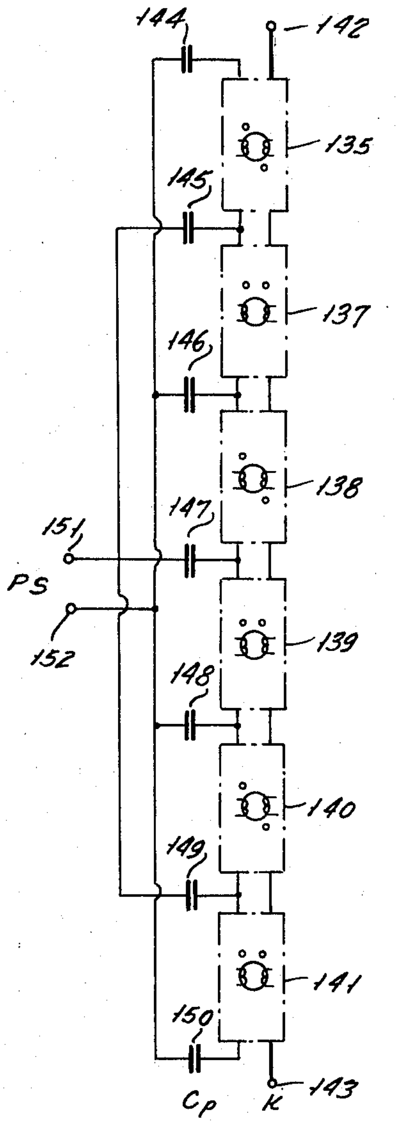

FIGURE 5 illustrates the manner in which a plurality of subassemblies of FIGURE 4 may be connected in series with one another.

Figure 6:
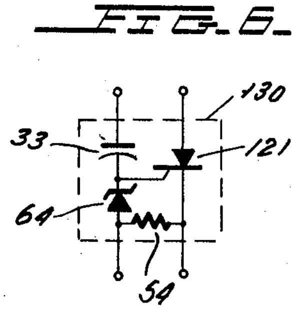

FIGURE 6 illustrates a modification of the control circuit shown in FIGURE 3 when contained within a module.

Figure 7:
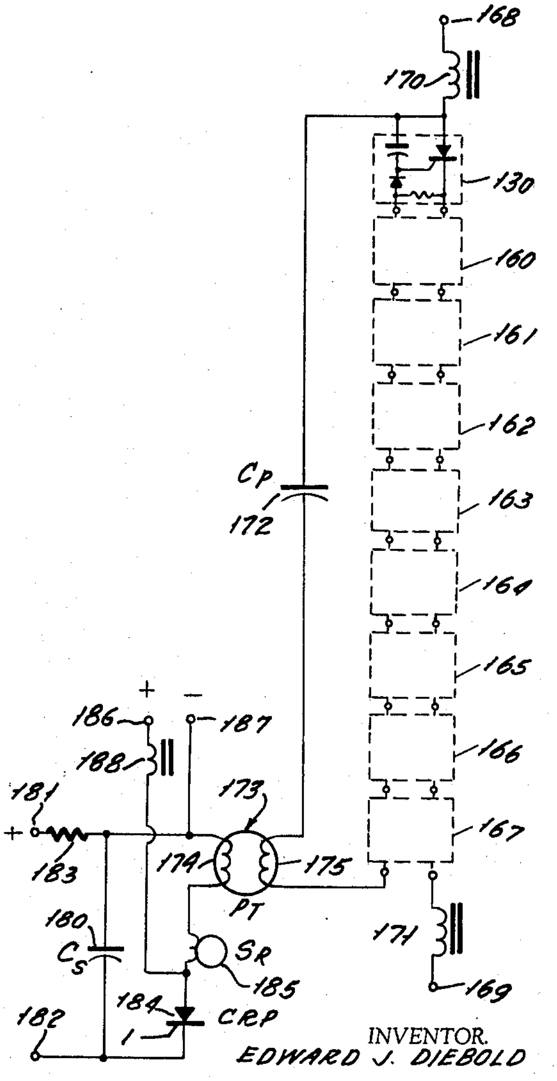

FIGURE 7 illustrates the manner in which modules of the type shown in FIGURE 6 can be connected in series, and particularly illustrates a novel pulse source for the system.

FIGURES 8*a*, 8*b*, 8*c* and 8*d* illustrate, on a common time base, various voltages and currents to describe the theory of operation of the present invention.

As indicated above, an important feature of the invention lies in the provision of a high current, short duration pulse in combination with means for maintaining anode-cathode voltage on a given controlled rectifier. The actual behavior of the controlled rectifier, as presently understood, is that, when a firing pulse is applied between the gate and cathode, the active part of a controlled rectifier is momentarily swamped with carriers. These carriers begin to move under the influence of the anode potential which is provided by the circuit connected from the anode to the cathode of the individual rectifier.

The motion of the negative carriers effectively increases the anode current where this increasing current is slightly supplemented at a later time by positive charging carriers. By providing a vast excess of carriers at the gate circuit of the controlled rectifier, as by direct injection of negative carriers into the junction sandwich, the phenomenon of carrier multiplication by collision would appear to initiate the turn-on process. This tends to spread by the carriers provided from the anode circuit where the spreading velocity is given by the property of the carriers and is approximately constant from one controlled rectifier to another so long as carriers are injected in abundance from the gate from the onset of injection, and so long as there is a follow-up of current from the anode without any delay. There are some delays which cannot be avoided, of course, such as the delays due to the natural carrier motion within the controlled rectifier and through the layer thicknesses which form the junction sandwich, although these velocities and thicknesses are constant from one device to the next.

Once the injection of the carriers at the gate has initiated a flow of carriers in the anode to cathode circuit, the resistance of the anode to cathode circuit is reduced, and the increase of current therethrough is governed by the normal rise in turn-on current which cannot be accelerated. However, where the anode to cathode path of the controlled rectifier includes a discharging capacitor, it is possible to force a rise in current through the anode to cathode path with the voltage across the controlled rectifier remaining essentially constant (or slightly decreasing), while the anode to cathode current increases from the low initial turn-on value to a substantial current by the current capacity of the controlled rectifier. It is only when the current has reached this relatively high magnitude that the voltage across the anode to cathode path begins to decrease.

The time required for this rise in current, however, is sufficient to allow other controlled rectifiers which are in series to turn on either partially or fully. Therefore, the entire series connected group of controlled rectifiers will be in a gradual turn-on process during which voltage across the respective rectifiers remains relatively constant with the current increasing steadily.

If the external circuit is able to provide the increase in current through the entire series connected string of controlled rectifiers, the voltage observed across the entire string will appear to be decreasing, but only after current begins to rise substantially. Thus, the entire string of rectifiers behaves as one controlled rectifier.

The tendency for voltage collapse of one controlled rectifier to force a rise in voltage across another controlled rectifier (as in the sympathetic-type firing systems) will be counteracted in accordance with the present invention by the following:

(a) It is necessary to force a rise in current through the device which tends to have the faster voltage reduction.

(b) It is necessary to provide an external charging current for increasing the voltage in the shunt capacitor across the device which lags in its turn-on.

Therefore, the voltage dividing effect under transient conditions, which is provided by the shunting capacitor of the particular device, also operates in accordance with the invention to be effective during the turn-on interval with the voltage transition from full blocking voltage to a small forward voltage drop on the entire string proceeding in an orderly manner.

As a further advantage of the invention, it will be observed that the firing pulse, although of very high magnitude, is required only for a very short time. Therefore, the pulse circuitry can contain capacitor and transformer type devices which provide isolation of the gate circuitry from the anode to the cathode circuitry.

Another desirable feature of this novel turn-on method is that the gate pulse will occur in its entirety before the actual turn-on effect is visible in the anode to cathode circuits of the controlled rectifiers. This apparent separation between gate pulse and turn-on is due to the very high ratio of rated anode current to minimum anode current, or holding current. Thus, for a typical controlled rectifier having an average rating of 16 amperes (approximately 50 ampere peak value during induction), the holding current is only 15 milliamperes. The normal typical gate current required to fire such a device would be 25 milliamperes at a typical operating temperature.

In accordance with the invention, however, a firing pulse which would be of the order of 10 amperes is injected into the gate to cathode circuit for approximately 1/4 of a microsecond. With this invention, the number of carriers injected into the controlled rectifier is commensurate with the number of carriers which are required for full current capacity of the device. However, during the turn-on, a vast number of these carriers are lost as by recombination, capture by the wrong electrode, or neutralization due to carrier displacement present because of the forward blocking potential. Therefore, if theoretically a forward current of 15 milliamperes will turn the controlled rectifier on, a gate current of more than 10 amperes is injected in accordance with the invention, a gate to anode current transfer will occur at a level which will be in the vicinity of 1 ampere at a time which coincides with the decay of gate signal and increase of anode current from zero to 1 ampere. As compared to the ultimate current of 50 amperes peak, this 1 ampere current is relatively small, although much greater than the absolute minimum of 15 milliamperes. Therefore, the turn-on may proceed without delay and in a very positive manner.

Figure 1:
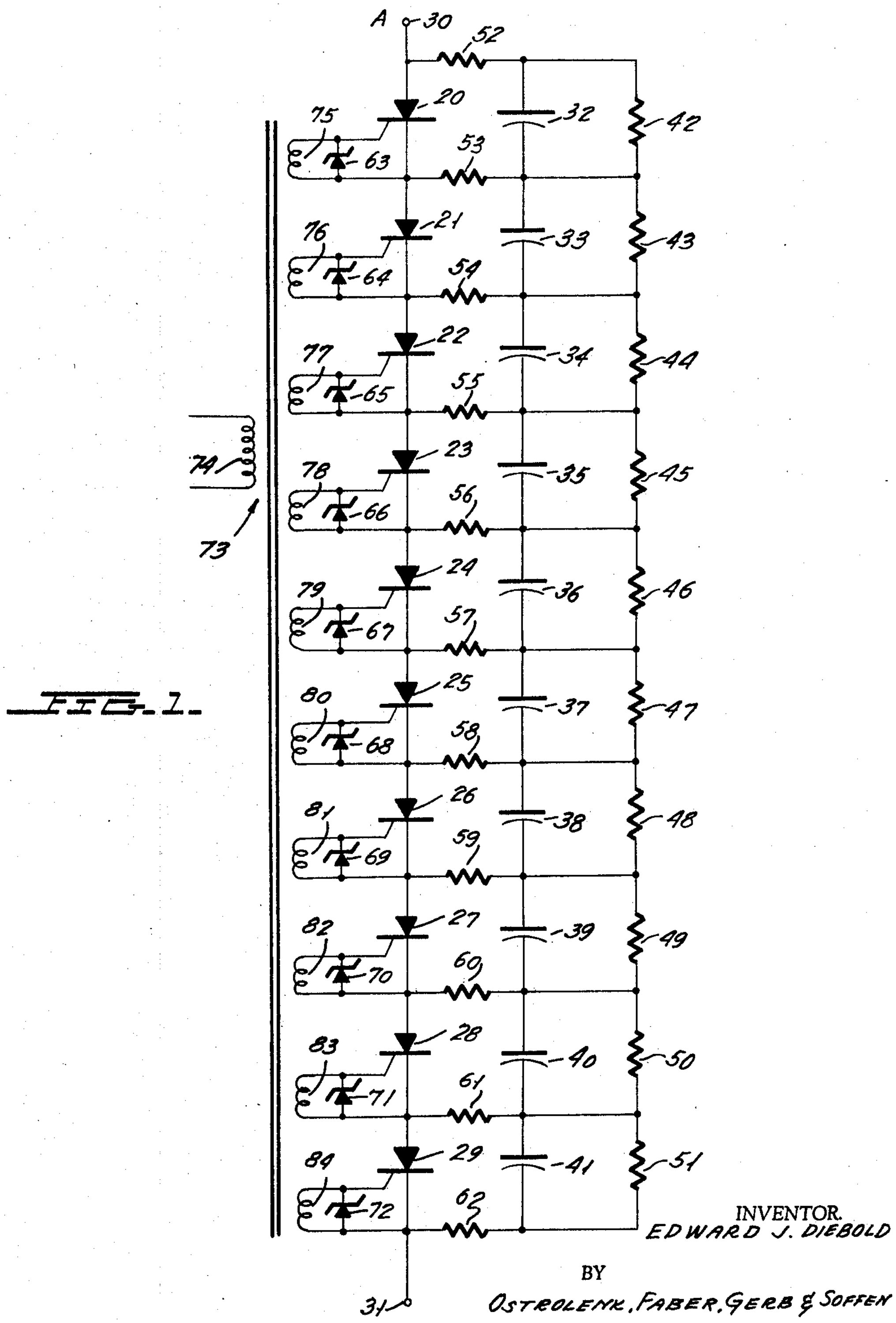
FIGURE 1 shows a circuit diagram of a plurality of series connected controlled rectifiers which are provided with a pulse generator of specific dimensions and resistive-capacitive voltage distributing systems in accordance with the invention.

Referring first to FIGURE 1, I have illustrated therein a typical series connected system of controlled rectifiers which is provided with parallel connected resistance-capacitance circuits for each of the rectifiers in combination with a pulse generating system which utilizes a pulse in accordance with the invention.

More specifically, FIGURE 1 shows 10 controlled rectifiers 20 through 29 which are connected in series between an anode terminal 30 and a cathode terminal 31. The use of 10 rectifiers is intended for illustrative purposes only, it being understood that the invention makes it possible to connect more than 10 controlled rectifiers in series, or makes it possible to use a sufficient number of controlled rectifiers in series to define a system having a voltage rating greater than 10,000 volts peak reverse voltage, or peak forward blocking voltage.

Each of the controlled rectifiers 20 through 29 is then provided with a shunt capacitor 32 through 41 respectively, and a shunt resistor 42 through 51 respectively.

Appropriate current limiting resistors 52 through 62 are then provided, as shown, whereby there are two of the limiting resistors in each of the shunt circuits of each of the controlled rectifiers.

The gate circuits of each of the controlled rectifiers 20 through 29 are provided with low voltage Zener diodes 63 through 72 respectively in the usual manner. As will be described more fully hereinafter, each of the controlled rectifiers, along with its respective control elements such as shunting capacitor-resistor, by-pass resistor, and gate protecting diode, can be mounted in a common module, as illustrated in my copending application Serial No. 56,592 with similar methods of shielding, end shielding, screening and cooling being provided in accordance with the above noted application.

A main pulse transformer 73 is then provided which has a single primary winding 74 and a plurality of secondary windings 75 through 84 which are connected in the gate cathode circuits of controlled rectifiers 20 through 29 respectively. The primary and secondary windings of pulse transformer 73 should be well insulated from one another with a low coupling capacitance as compared to the capacitance of capacitors 32 through 41. Moreover, and because of the required short pulse which is placed on the gate circuits of the rectifiers in accordance with the invention, the series inductance between primary winding 74 and any one of the secondary windings 75 through 84 respectively should be as low as possible. In addition, the series inductance between the above noted windings should be equally distributed between the primary winding and any one of the secondary windings.

FIGURE 1 illustrates the basic concept of the invention wherein the pulse applied to the gate cathode circuits of rectifiers 20 through 29 has a magnitude of the order of 100 to 1,000 times as great as the minimum required firing current, and have a duration of the order of $\frac{1}{10}$ of the time required for firing or turning-on any of the controlled rectifiers.

This novel pulse is, of course, utilized in combination with capacitors 32 through 41 respectively which supply a sufficient anode current for each of the rectifiers to permit each of the rectifiers to turn on with the voltage across the rectifiers being held relatively constant during the turn-on interval.

For practical purposes, the pulse transformer 73, shown in FIGURE 1, becomes very difficult to design when a large number of controlled rectifiers are connected in series. That is to say, in accordance with the invention, several hundred controlled rectifiers may be connected in series. If this were the case, the practical design problems which arise in connection with the pulse transformer 73 become almost insurmountable.

Figure 2:
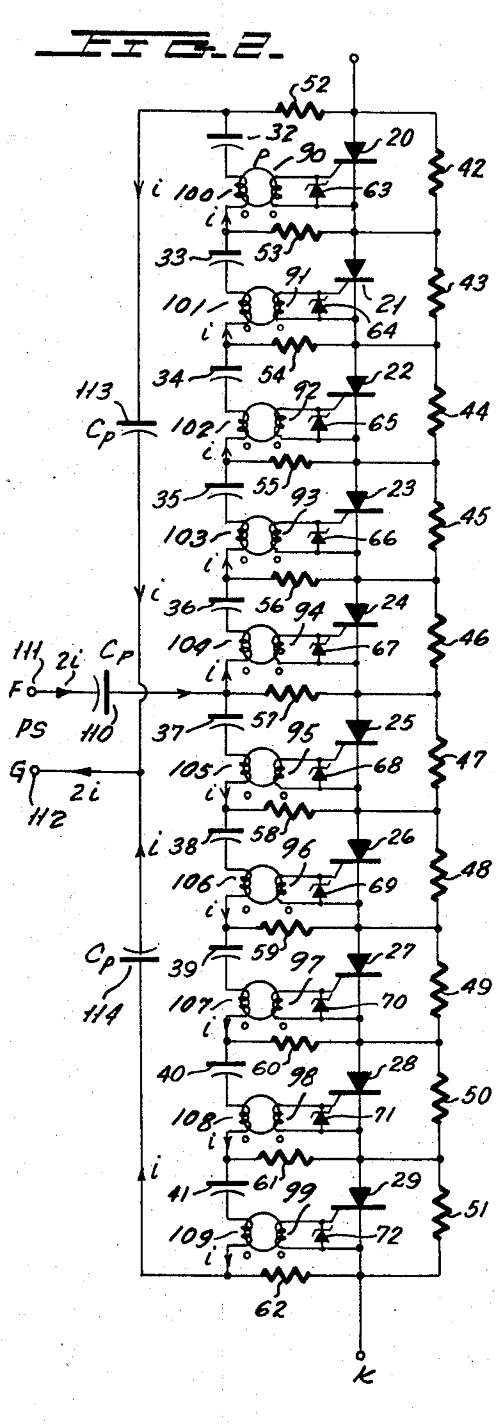
FIGURE 2 shows a modification of the circuit of FIGURE 1 wherein improved pulse distribution means are provided.

FIGURE 2 is similar to the circuit of FIGURE 1 where similar components have been given similar identifying numerals, and illustrates a pulse transformer system which is ideally suited to the distribution of a firing pulse to however large a number of controlled rectifiers are selected for series connection. More specifically, in FIGURE 2, the gate circuits of each of the controlled rectifiers 20 through 29 are provided with secondary windings 90 through 99 which are wound on saturable-type cores which have primary windings 100 through 109 respectively.

The cores for each of the controlled rectifiers 20 through 29 are designed to have a volt-second rating (the integrated value of voltage applied to a winding for a length of time to cause saturation of the core) which permits at least transfer of the pulse energy required to the respective gate circuit. The polarities of the primary and secondary windings of the saturable reactors are indicated in FIGURE 2 by dots which designate the starts of the windings, and, thus, designate points of similar polarity.

The primary windings 100 through 109 are connected in the circuit which includes the capacitors 32 through 41 of rectifiers 20 through 29 respectively wherein the main difference between the circuit of FIGURE 2 and FIGURE 1 is that the primary windings of all of the pulse transformers are connected in series with the capacitors of the respective rectifiers. The secondary windings are, of course, connected in a manner identical to that of FIGURE 1.

It should be noted that the upper five secondary windings 90 through 94 differ in polarity from the five secondary windings 95 through 99.

The junction between winding 104 and capacitor 37 is connected to a coupling capacitor 110 which is, in turn, connected to a terminal 111 of a pulse source. The second terminal 112 of the pulse source, which will be described more fully hereinafter, is then connected to coupling capacitor 113 which is, in turn, connected to the top shunt capacitor 32, and is also connected to a second coupling capacitor 114 which is, in turn, connected to the end of winding 109.

It is to be specifically noted that the pulse transformers utilized in FIGURE 2 are of the type for transforming pulses of very short duration (of very high frequency), and would not be useful in low frequency or D.-C. applications, since the transformer cores would saturate and the windings would become short circuits for the equipment to which they are connected. Thus, under normal operating circumstances, the primary windings of all of the pulse transformers are assumed to be low resistance short circuits. This permits the capacitors 32 through 41 to divide voltage equally among the controlled rectifiers 20 through 29, as is their major purpose. After turn-on, these capacitors will discharge into their respective controlled rectifiers through their current limiting resistors.

In operation, and when the entire string of controlled rectifiers 20 through 29 are in their forward blocking condition (main anode terminal 30 is positive with respect to the main cathode terminal 31), then all of the controlled rectifiers will have approximately the same positive forward voltage applied to them because of the voltage division afforded by shunting resistors 42 through 51 and shunting capacitors 32 through 41.

The current required for this voltage distribution is, under normal operating conditions, relatively low, and changes slowly. This means that the pulse transformers transform substantially no voltage or current into the gate circuits of the respective controlled rectifiers which are, therefore, turned off.

As shown in FIGURE 2, the center of the string of capacitors 32 through 41 are connected through coupling capacitor 110 which is connected to terminal 111 of the pulse supply. The ends of this string of capacitors are additionally connected through the two coupling capacitors 113 and 114 respectively which are of the same size and which are connected to the common terminal 112 of the pulse supply system. When a very rapidly rising pulse voltage is applied between terminals 111 and 112 with the terminal 111 being positive with respect to terminal 112, a high magnitude pulse current will flow through the string of capacitors 32 through 41 and the coupling capacitor 110 in the direction indicated by the arrows labeled *i* in FIGURE 2.

The current *i* is of ½ the magnitude of 2*i* obtained from terminals 111 and 112, and is divided equally into the two branches including capacitors 113 and 114 respectively. In the upper branch including capacitors 32 through 36, the current flows upwardly to cause a downwardly directed positive pulse on the left-hand side of pulse transformers 100 through 104 respectively. This corresponds to an upwardly directed positive voltage pulse on windings 90 through 94 respectively, thus making all of the gates of controlled rectifier 90 through 94 positive.

At the same time, and in the lower half of the assembly, the downwardly directed current *i* causes a voltage on windings 105 through 109 which is positive on the upper side of the windings and is also positive on the upper side of secondary windings 95 through 99 respectively to again cause a positive gate signal. The voltage drop in the primary windings of the pulse transformers will cause a decrease in the anode to cathode voltage of the controlled rectifiers 20 through 24 and a similar increase in anode to cathode voltage on controlled rectifiers 25 through 29. This, however, is a relatively small voltage, since the maximum voltage which is tolerated on the gate firing circuit for each of the controlled rectifiers is only a few percent of the rated voltage of tre high voltage rectifier which would be used in this type circuit.

The circuit shown in FIGURE 2 has the advantage that the string of capacitors 32 through 41 which carries the pulse current is at one and the same time the voltage dividing capacitor circuit. Therefore, the small systematic voltage unbalance introduced by the positive firing voltage is automatically self-balanced between the two halves (upper and lower) of the assembly without causing excessive voltage stress or voltage unbalance in the voltage distribution between the controlled rectifiers.

A further advantage of the system of FIGURE 2 is that the voltage between the primary and secondary windings of the pulse transformers is, at the most, a few volts, and is specifically given by the voltage drop of the appropriate two current limiting resistors of the current limiting resistors 52 through 62.

Thus, the pulse transformers of both of the low voltage, high current, short pulse-type are relatively inexpensive and are not exposed to excessive dielectric stress. Furthermore, the entire string remains unaffected by interwinding coupling capacitance or other stray effects which would adversely affect a large pulse transformer of the type shown in FIGURE 1.

It is to be particularly noted that the coupling capacitors 113 and 114 are connected between the terminals 30 and 31, and have the ability of reducing voltage transsients across the entire assembly. Moreover, and because the firing pulse is supplied from terminal 112 through both capacitors 113 and 114 in parallel to the anode and cathode terminals 30 and 31 respectively, the pulse cannot be propagated outside of the assembly and into other parts of the system. Therefore, the pulse from terminals 111 and 112 cannot fire other controlled rectifiers outside of rectifiers 20 through 29 which may be electrically connected to the system.

Furthermore, the system is caused to be relatively insensitive to sudden voltage changes which appear from outside of the circuit between terminals 30 and 31, since such signals would be short circuited by the two capacitors 113 and 114 which are in series rather than by capacitors 32 through 41.

As previously indicated, the novel arrangement of FIGURE 2 can be extended to any desired large number of controlled rectifiers required for a given voltage output requirement.

Since the addition of a great number of series connected elements introduces difficulties of voltage division during forward and reverse blocking and during turn-on because of the delay effects due to the finite propagation velocity along such a complex system, as well as problems involving transient voltage division, these problems have been successfully faced in the past by means of the formation of the series connected elements and their control elements in sub-systems of modules, or more generally, by forming the main system of a homogeneous group of sub-systems. Each of the sub-systems then forms one complete module, and each assembly forms a complete entity in itself. A large number of multiple assemblies then form the total system.

When this approach is used with controlled rectifiers, rather than normal rectifiers, as described in my copending application Serial No. 56,592, the only difference is in the requirement of firing each assembly. Thus, as shown in FIGURE 2, the pulse supply terminals 111 and 112 are separated from the "subassembly" by coupling capacitors 110, 113 and 114. Since only three capacitors are required, it becomes possible to use capacitors with a very high voltage rating which permits the pulse supply to operate at a different potential level than the assembly itself.

A typical module arrangement for one module of the individual subassembly is schematically illustrated in FIGURE 3 for the case of controlled rectifier 21. Thus, in FIGURE 3, the controlled rectifier 21, its by-pass capacitor 33, its current limiting resistor 54, its pulse transformer, which includes windings 101 and 91, and its Zener diode 64 may all be mounted on a common module-type chassis, indicated by the dotted lines 130 in the manner illustrated in copending application Serial No. 56,592.

The module will then have four terminals, two of which are used for power connections, and two of which are used for transmission of the pulse for turn-on.

FIGURE 4 illustrates the module 130 along with an identical group of modules 131 through 134 (where the subassembly includes 5 modules and, therefore, 5 series connected controlled rectifiers) to form the subassembly indicated by dotted lines 135.

The subassembly requires an additional resistor 136 (which corresponds to resistor 52 of FIGURE 2). The complete system may then be arranged, as illustrated in FIGURE 5, of a plurality of subassemblies similar to subassembly 135, and more specifically schematically illustrated as subassemblies 135 and 137 through 140. Note that the system of FIGURE 5 would include 30 series connected controlled rectifiers between the main anode terminal 142 and the main cathode terminal 143.

The various coupling capacitors 144 through 150 are then connected to the subassemblies in the manner illustrated, and are connected to terminals 151 and 152 of an appropriate pulse supply system.

The polarity for firing the controlled rectifiers of the various subassemblies 135 and 137 through 141 is schematically illustrated by the polarity of the schematically illustrated pulse transformers within each of the boxes. This novel arrangement of polarities is similar in principle to the opposing polarities used for the upper and lower groups of pulse transformers in FIGURE 2.

The circuits illustrated in FIGURES 1 and 2 are particularly useful where the controlled rectifier must operate in a system which requires high speed of response, or where the main power circuit has low inductance. Many applications exist, however, as where the system is to be used as a 60 cycle per second inverter where the main power circuit may have a substantial inductance. In such applications, it is not necessary to use the pulse transformer scheme of FIGURE 2, but the firing pulse voltage may be impressed directly on the entire assembly with the gate circuits in series with the voltage dividing capacitors.

This type of arrangement is specifically shown in FIGURE 6 for the case of a single module of a single subassembly of the system.

Referring now to FIGURE 6, I have illustrated therein the controlled rectifier 21 of FIGURE 3 which is carried on the module 130 along with its capacitor 33 and resistor 54 and gate protecting Zener diode 64. As illustrated, the lower terminal of capacitor 33 is directly connected to the gate electrode of controlled rectifier 21.

A plurality of these modules, which includes module 130 along with identical modules 160 through 167, is illustrated in FIGURE 7 for a particular assembly of devices. In FIGURE 7, the modules illustrated are connected between the main anode terminal 168 and main cathode terminal 169, and include two reactors 170 and 171 connected, as illustrated, between the upper and lower portions of the string and the respective terminals. Each of reactors 170 and 171 preferably have a very low inductance which is of the order of 1 millihenry.

In order to fire the string, a coupling capacitor 172 couples the string to a pulse generation circuit which includes at the output thereof a pulse transformer 173 which has a primary winding 174 and a secondary winding 175 connected in series with capacitor 172 where the two windings are wound on a core of saturable-type material.

Assuming now that a pulse can appear at winding 175 in a manner to be described more fully hereinafter so that a positive voltage will appear at the top of the string of modules, there will be a sudden increase in the blocking voltage of the entire assembly. However, the magnitude of this sudden voltage increase is relatively small when compared to the forward blocking voltage of the entire string. However, the rate of rise of this voltage increase is very high. Therefore, the voltage appears on the gates of the series connected controlled rectifiers, since the capacitors connected in parallel with the various controlled rectifiers have a low impedance for this short pulse, and their diodes, such as diode 64 of FIGURE 6, are in the blocking direction. The external circuit cannot provide a by-pass for this pulse because of the inductance provided by reactors 170 and 171. Moreover, the circuit of FIGURE 7 is safe from turn-on by external voltages since the inductors 170 and 171 prevent a sudden influx of a turn-on current to the various modules which are by-passed by their own shunting capacitors and by the external capacitor 172.

In operation, the inductances 170 and 171 are similar to the so-called commutating chokes necessary for the operation of an inverter.

Referring now to the pulse generating circuit of FIGURE 7, the pulse generator consists of an energy storage capacitor 180 which is connected to a D.-C. power supply at terminals 181 and 182 through a charging resistor 183. The D.-C. power supply charges the capacitor 182 to a voltage of several hundred volts. A pulsing controlled rectifier 184 is connected in closed series relation with capacitor 180, the primary winding 174 of pulse transformer 173, and the winding of a small saturable reactor 185.

The magnetizing current of saturable reactor 185 is lower than the magnetizing current of core 173 required to flow through winding 174 before transformer action can occur between windings 174 and 175. The winding 174 of the pulse transformer 173 and the saturable reactor winding 185 are then biased by a D.C. bias provided from a D.C. source connected to terminals 186 and 187 which are in series with a choke 188.

An alternating current source is then connected in the gate circuit of the pulsing controlled rectifier 184 to fire this rectifier at a predetermined frequency.

When the pulsing controlled rectifier 184 is fired, inrush current through the pulse transformer winding 174 is delayed until saturable reactor 185 saturates. The time taken for the saturation of reactor 185 is preferably a short time in the order of 2 microseconds. After this time, the discharge current of capacitor 180 may rise to a very high value in a very short time.

The use of saturable reactor 185 in the turn-on circuit of the pulse generator has the advantage that the rise time of the current is very drastically reduced. Moreover, the peak pulse current is greatly increased.

The reason for this is that a controlled rectifier, after firing, requires a substantial amount of time to ionize the entire junction sandwich. If, immediately after firing a moderate current in the order of 1 ampere flows for a certain delay time, and this current provides necessary carriers for the ionization of the controlled rectifier, then the internal resistance of the rectifier becomes very low with its forward voltage drop decreasing radically. After this time, and when the saturable reactor 185 saturates, the controlled rectifier is in a state of full conduction with low internal resistance and an abundant supply of carriers. Accordingly, the current can rise without limitation due to the controlled rectifier, and is determined solely by the inductance of the pulse transformer, the leakage reactance of the saturable reactors 185, and the capacitances in the circuit.

Where a controlled rectifier has a current rating of 16 amperes, and is turned on directly with a high current pulse, it will carry a peak pulse current of approximately 200 to 300 amperes. If a higher pulse current is forced through the controlled rectifier, it will be destroyed because the lack of ionization causes such a high forward voltage drop in its wafer that the excessive heat will destroy it.

However, if a short delay is introduced, this current can be increased to more than 10,000 amperes for a few microseconds without damage to the controlled rectifier. Simultaneously, the turn-on current rises much more rapidly so that when the concept is applied to a pulse generation system, a pulse with a short mean duration (a high equivalent frequency) may be generated.

Thus, the pulse transformer can be made very efficient at this high frequency with the coupling capacitors and internal capacitors of the modules having a very low impedance. Therefore, the entire pulse produced in the pulse generating circuit is transferred with maximum efficiency to the controlled rectifiers in the modules of the string.

To illustrate the typical behavior of a circuit formed in accordance with the present invention, FIGURES 8*a*, 8*b*, 8*c* and 8*d* illustrate typical voltage and current relationships with respect to time in the various components of the system.

Figures 8A, 8B, 8C, 8D:
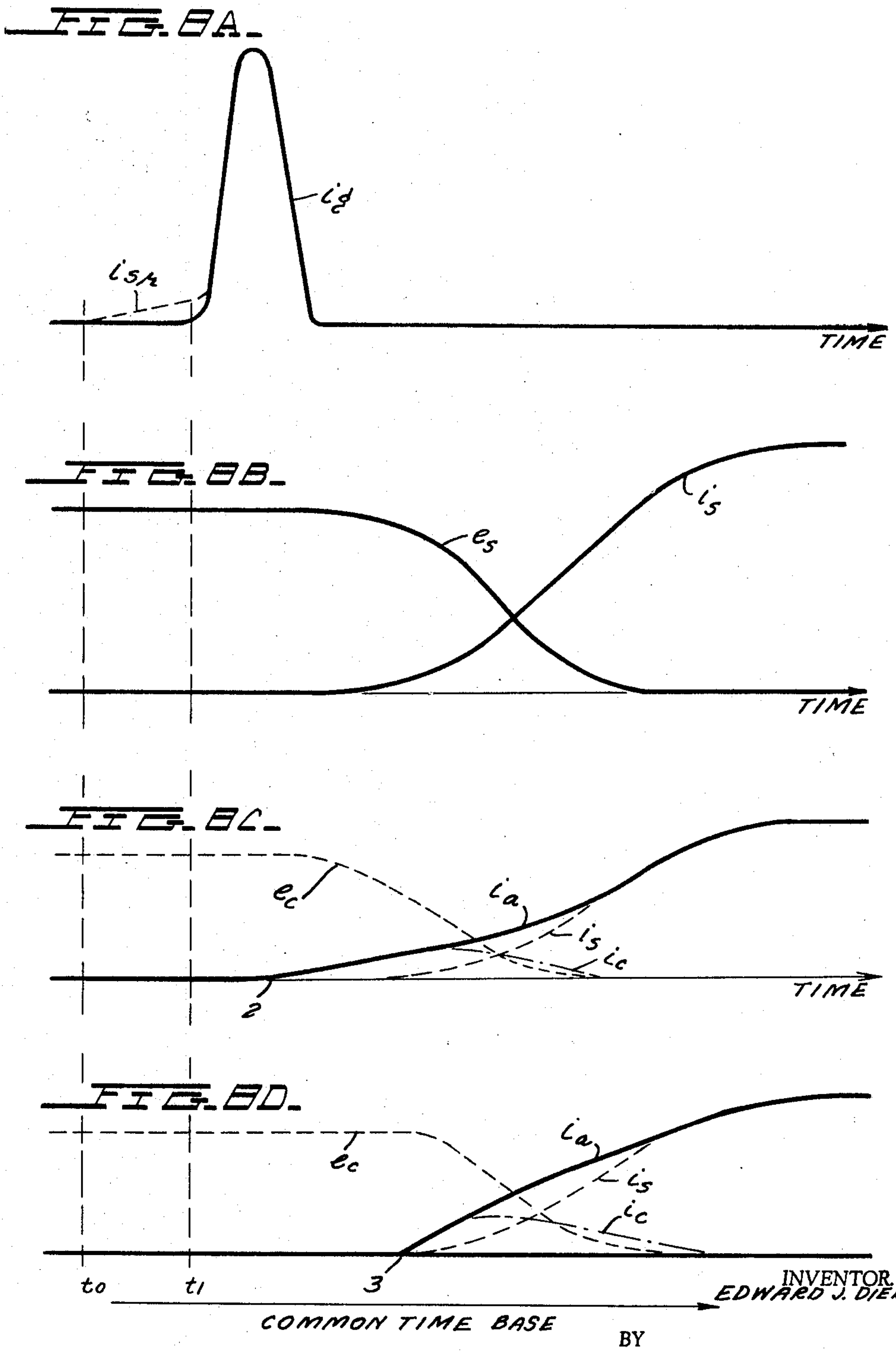

FIGURE 8*a* more specifically shows the firing pulse provided from a pulsing circuit such as the pulsing circuit of FIGURE 7. At time $t_0$ in FIGURE 8*a*, the pulsing controlled rectifier 184 is fired. It immediately begins to conduct a current indicated by the dotted line $i_{sr}$ which is limited by the saturable reactors 185, as previously discussed.

The saturable reactor 185 saturates at time $t_1$, and capacitor 180 discharges through the rectifier 184 and the primary winding 174 of the pulse transformer 173. Secondary winding 175, therefore, provides a pulse current which rises to a high magnitude and oscillates back to zero at which point the controlled rectifier 184 is turned off. Note that the figure is not to scale, since the discharge pulse $i_g$ is of a duration of less than ½ microsecond, whereas the delay before the pulse is more than 2 microseconds.

The pulse current of FIGURE 8*a* is then supplied to the gate circuits of all of the controlled rectifiers where the gate current is represented by the current $i_g$ of FIGURE 8*a*. Because of the short duration of the gate current, none of the individual controlled rectifiers of the string are turned on.

FIGURE 8*c* illustrates the anode current, or turn-on current, $i_a$ for an individual controlled rectifier of the string which is the rectifier which turns on the earliest. It is assumed that this particular controlled rectifier has an extremely short firing delay time so that its anode current $i_a$ has begun to rise quickly.

In FIGURE 8*d*, the anode current $i_a$ of a controlled rectifier in the string which fires much later than that of FIGURE 8*c* is also shown.

FIGURES 8*c* and 8*d* also show the capacitor discharge current $i_c$ of the shunting capacitors which shunt their respective controlled rectifier. The current $i_s$ is also shown in FIGURES 8*c* and 8*d* which is the turn-on current of the entire string.

Referring first to the controlled rectifier of FIGURE 8*c* which is the one which turns on the earliest, it is seen that its anode current $i_a$ is provided mainly by the capacitor discharge current $i_c$, whereas the current provided by flow through the entire string rises at a later time. Therefore, the anode current wave shape of FIGURE 8*c* shows two distinct rises; the first rise is for the capacitor inrush current; the second rise is when the entire current of the string rises to its full magnitude.

Referring now to the later fired rectifier of FIGURE 8*d*, there is also a double current rise at the beginning, one given by the capacitor discharge and the other by the rise of current of the entire string.

From FIGURES 8*c* and 8*d*, therefore, it is shown that although there is a difference in turn-on time of the individual controlled rectifiers, their turn-on proceeds unhampered and in an individual manner without affecting the performance of the entire string.

FIGURES 8*c* and 8*d* further show the votage $e_c$ which is the voltage across the shunt capacitor of the respective controlled rectifier. This voltage in FIGURE 8*c* for the fast turn-on device decreases gradually, while the voltage $e_c$ decreases rapidly for the slower turn-on device of FIGURE 8*d*. This difference in voltage decrease is due to the discharging of the capacitor which is given by the amount of current allowed to flow.

For the earlier turn-on rectifier of FIGURE 8*c*, the voltage decay is slowed down by the current limiting resistors associated with the device which limit the capacitor discharge current and, therefore, limit the rate of discharge of the capacitor.

For the later fired controlled rectifier of FIGURE 8*d*, the voltage drop across the current limiting resistor is reduced by the counter flow of current of adjacent controlled rectifiers which have turned on earlier. Therefore, the voltage drop across these resistors is greatly reduced, and the capacitor discharges more rapidly, whereby the voltage decay occurs at an earlier time. Accordingly, there is an equalization of voltage decrease across the capacitors.

FIGURE 8*b* shows the voltage decay across the entire string of controlled rectifiers $e_s$, and the current increase through the total string $i_s$. The voltage decrease $e_s$ is given by the sum of all the voltages of all the controlled rectifiers in the string, and occurs rapidly once the rise of current is started. The current rise, however, is delayed both in its beginning and ending because the individual differences of the controlled rectifiers are permitted different current rises which are spread out by the discharging of their respective capacitors. Therefore, this method has the advantage that so-called sympathetic firing is suppressed rather than encouraged to thereby eliminate the possible firing of the controlled rectifiers at one end of a string (by accident), and then propagate this localized firing through the entire string with the majority of the controlled rectifiers broken down by overvoltage.

In the system according to the present invention, if any one controlled rectifier should accidentally turn on (as due to deterioration of break-down voltage characteristics), its associated capacitor would discharge gradually through the discharge resistors, and thereafter the controlled rectifier would not contribute to the overall voltage in a manner similar to a failed diode in a string of diodes of a high voltage rectifier.

From the foregoing, it will be recognized that the capacitors connected across each controlled rectifier have multiple functions, and are vitally important for the operation of the system.

The functions of the capacitors are as follows:

(a) They provide transient A.-C. voltage division in both the forward and reverse direction for transient voltages which come from outside of the system as well as those due to reverse recovery hole storage effects, variable capacity effects and other noise introduced by the controlled rectifier itself.

(b) They operate to limit surge voltages by absorbing the surge voltage energy. It should be noted that the division of voltage transients equally amongst all the controlled rectifiers is not sufficient if excessive voltage surges exist which can be absorbed and eliminated by these capacitors.

(c) The string of series connected capacitors conduct the gate firing pulse from the pulse transformer to each individual controlled rectifier.

(d) The capacitors supply the anode current to each controlled rectifier during turn-on to maintain current in the anode circuit which generates the current carriers needed for successful operation, while maintaining the voltage on the anode and, thus, preventing premature voltage collapse of any of the controlled rectifiers with subsequent excessive overvoltage on the neighboring controlled rectifiers.

Although this invention has been described with respect to its preferred embodiments, it should be understood that many variations and modifications will now be obvious to those skilled in the art, and it is preferred, therefore, that the scope of this invention be limited not by the specific disclosure herein but only by the appended claims.

What is claimed is:

1. A firing system for a plurality of series connected controlled rectifiers; each of said controlled rectifiers having an anode-cathode circuit, a gate-cathode circuit and an anode, cathode and gate terminals; said anode-cathode circuit terminating at said anode and cathode terminals respectively; said gate-cathode circuit terminating at said gate and cathode terminals respectively; each of said plurality of series connected controlled rectifiers having a parallel connected resistor and a parallel connected capacitor in their anode-cathode circuit for distributing steady state and transient voltages between said plurality of series connected controlled rectifiers; and a pulse generating circuit connected to the gate-cathode circuit of each of said plurality of controlled rectifiers; said pulse generating circuit generating pulses to fire each of said rectifiers having a magnitude of at least 100 times the minimum magnitude of current required to fire any one of said plurality of controlled rectifiers; and a duration less than the length of time required to turn on any of said controlled rectifiers.

2. A firing system for a plurality of series connected controlled rectifiers; each of said controlled rectifiers having an anode-cathode circuit, a gate-cathode circuit and an anode, cathode and gate terminals; said anode-cathode circuit terminating at said anode and cathode terminals respectively; said gate-cathode circuit terminating at said gate and cathode terminals respectively; each of said plurality of series connected controlled rectifiers having a parallel connected resistor and a parallel connected capacitor in their anode-cathode circuit for distributing steady state and transient voltages between said plurality of series connected controlled rectifiers; and a pulse generating circuit connected to the gate-cathode circuit of each of said plurality of controlled rectifiers; said pulse generating circuit generating pulses to fire each of said rectifiers having a magnitude of at least 100 times the minimum magnitude of current required to fire any one of said plurality of controlled rectifiers and a duration less than the length of time required to turn on any of said controlled rectifiers; said plurality of controlled rectifiers comprising at least 10 controlled rectifiers.

3. A firing system for a plurality of series connected controlled rectifiers; each of said controlled rectifiers having an anode-cathode circuit, a gate-cathode circuit and an anode, cathode and gate terminals; said anode-cathode circuit terminating at said anode and cathode terminals respectively; said gate-cathode circuit terminating at said gate and cathode terminals respectively; each of said plurality of series connected controlled rectifiers having a parallel connected resistor and a parallel connected capacitor in their anode-cathode circuit for distributing steady state and transient voltages between said plurality of series connected controlled rectifiers; and a pulse generating circuit connected to the gate-cathode circuit of each of said plurality of controlled rectifiers; said pulse generating circuit generating pulses to fire each of said rectifiers having a magnitude of at least 100 times the minimum magnitude of current required to fire any one of said plurality of controlled rectifiers and a duration less than the length of time required to turn on any of said controlled rectifiers; said plurality of series connected controlled rectifiers having a total peak reverse and blocking voltage of at least 10,000 volts.

4. A firing system for a plurality of series connected controlled rectifiers; each of said controlled rectifiers having an anode-cathode circuit, a gate-cathode circuit and an anode, cathode and gate terminals; said anode-cathode circuit terminating at said anode and cathode terminals respectively; said gate-cathode circuit terminating at said gate and cathode terminals respectively; each of said plurality of series connected controlled rectifiers having a parallel connected resistor and a parallel connected capacitor in their anode-cathode circuit for distributing steady state and transient voltages between said plurality of series connected controlled rectifiers; and a pulse generating circuit connected to the gate-cathode circuit of each of said plurality of controlled rectifiers; said pulse generator including a saturable reactor core having a primary and secondary winding for each of said controlled rectifiers; said primary windings being connected to a main pulse generator source; said secondary windings being connected in the gate-cathode circuit of their respective controlled rectifier.

5. A firing system for a plurality of series connected controlled rectifiers; each of said controlled rectifiers having an anode-cathode circuit, a gate-cathode circuit and an anode, cathode and gate terminals; said anode-cathode circuit terminating at said anode and cathode terminals respectively; said gate-cathode circuit terminating at said gate and cathode terminals respectively; each of said plurality of series connected controlled rectifiers having a parallel connected resistor and a parallel connected capacitor in their anode-cathode circuit for distributing steady state and transient voltages between said plurality of series connected controlled rectifiers; and a pulse generating circuit connected to the gate-cathode circuit of each of said plurality of controlled rectifiers; said pulse generating circuit including a saturable reactor core having a primary and secondary winding for each of said controlled rectifiers; said primary windings being connected to a main pulse generator source; said secondary windings being connected in the gate-cathode circuit of their respective controlled rectifier; said primary windings being connected in series with one another; said pulse generator source having a first terminal connected to each end of said series connection of primary windings; said pulse generator source having a second terminal connected to a central point in said series connection of primary windings.

6. A firing system for a plurality of series connected controlled rectifiers; each of said controlled rectifiers having an anode-cathode circuit, a gate-cathode circuit and an anode, cathode and gate terminals; said anode-cathode circuit terminating at said anode and cathode terminals respectively; said gate-cathode circuit terminating at said gate and cathode terminals respectively; each of said plurality of series connected controlled rectifiers having a parallel connected resistor and a parallel connected capacitor in their anode-cathode circuit for distributing steady state and transient voltages between said plurality of series connected controlled rectifiers; and a pulse generating circuit connected to the gate-cathode circuit of each of said plurality of controlled rectifiers; said pulse generating circuit including a saturable reactor core having a primary and secondary winding for each of said controlled rectifiers; said primary windings being connected to a main pulse generator source; said secondary windings being connected in the gate-cathode circuit of their respective controlled rectifier; said primary windings being connected in series with one another; said pulse generator source having a first terminal connected to each end of said series connection of primary windings; said pulse generator source having a second terminal connected to a central point in said series connection of primary windings; said secondary windings of said saturable reactor core on one side of said central point having a winding polarity opposite to those on the other side of said central point.

7. A firing system for a plurality of series connected controlled rectifiers; each of said controlled rectifiers having an anode-cathode circuit, a gate-cathode circuit and an anode, cathode and gate terminals; said anode-cathode circuit terminating at said anode and cathode terminals respectively; said gate-cathode circuit terminating at said gate and cathode terminals respectively; each of said plurality of series connected controlled rectifiers having a parallel connected resistor and a parallel connected capacitor in their anode-cathode circuit for distributing steady state and transient voltages between said plurality of series connected controlled rectifiers; and a pulse generating circuit connected to the gate-cathode circuit of each of said plurality of controlled rectifiers; said pulse generating circuit including a saturable reactor core having a primary and secondary winding for each of said controlled rectifiers; said primary windings being connected to a main pulse generator source; said secondary windings being connected in the gate-cathode circuit of their respective controlled rectifier; said primary windings being connected in series with one another; said pulse generator source having a first terminal connected to each end of said series connection of primary windings; said pulse generator source having a second terminal connected to a central point in said series connection of primary windings; said second terminal having a first coupling capacitor connected therein; said first terminal being connected to each end of said series connection of primary windings through respective second and third coupling capacitors.

8. A firing system for a plurality of series connected controlled rectifiers; each of said controlled rectifiers having an anode-cathode circuit, a gate-cathode circuit and an anode, cathode and gate terminals; said anode-cathode circuit terminating at said anode and cathode terminals respectively; said gate-cathode circuit terminating at said gate and cathode terminals respectively; each of said plurality of series connected controlled rectifiers having a parallel connected resistor and a parallel connected capacitor in their anode-cathode circuit for distributing steady state and transient voltages between said plurality of series connected controlled rectifiers; and a pulse generating circuit connected to the gate-cathode circuit of each of said plurality of controlled rectifiers; said pulse generating circuit including a saturable reactor core having a primary and secondary winding for each of said controlled rectifiers; said primary windings being connected to a main pulse generator source; said secondary windings being connected in the gate-cathode circuit of their respective controlled rectifier; each of said primary windings being connected directly in series with said parallel connected capacitor of the respective controlled rectifier.

9. A firing system for a plurality of series connected controlled rectifiers; each of said controlled rectifiers having an anode-cathode circuit, a gate-cathode circuit and an anode, cathode and gate terminals; said anode-cathode circuit terminating at said anode and cathode terminals respectively; said gate-cathode circuit terminating at said gate and cathode terminals respectively; each of said plurality of series connected controlled rectifiers having a parallel connected resistor and a parallel connected capacitor in their anode-cathode circuit for distributing steady state and transient voltages between said plurality of series connected controlled rectifiers; and a pulse generating circuit connected to the gate-cathode circuit of each of said plurality of controlled rectifiers; said pulse generating circuit including a saturable reactor core having a primary and secondary winding for each of said controlled rectifiers; said primary windings being connected to a main pulse generator source; said secondary windings being connected in the gate-cathode circuit of their respective controlled rectifier; each of said primary windings being connected directly in series with said parallel connected capacitor of the respective controlled rectifier; said primary windings being connected in series with one another; said pulse generator source having a first terminal connected to each end of said series connection of primary windings; said pulse generator source having a second terminal connected to a central point in said series connection of primary windings; said secondary windings of said saturable reactor on one side of said central point having a winding polarity opposite to those on the other side of said central point; said second terminal having a first coupling capacitor connected therein; said first terminal being connected to each end of said series connection of primary windings through respective second and third coupling capacitors.

10. A firing system for a plurality of series connected controlled rectifiers; each of said controlled rectifiers having an anode-cathode circuit, a gate-cathode circuit and an anode, cathode and gate terminals; said anode-cathode circuit terminating at said anode and cathode terminals respectively; said gate-cathode circuit terminating at said gate and cathode terminals respectively; each of said plurality of series connected controlled rectifiers having a parallel connected resistor and a parallel connected capacitor in their anode-cathode circuit for distributing steady state and transient voltages between said plurality of series connected controlled rectifiers; and a pulse generating circuit connected to the gate-cathode circuit of each of said plurality of controlled rectifiers; said pulse generating circuit generating pulses to fire each of said rectifiers having a magnitude of at least 100 times the minimum magnitude of current required to fire any one of said plurality of controlled rectifiers; said parallel connected resistor and capacitor of each of said controlled rectifiers being connected to said controlled rectifier cathode and anode terminals by first and second current limiting resistors respectively.

11. A firing system for a plurality of series connected controlled rectifiers; each of said controlled rectifiers having an anode-cathode circuit, a gate-cathode circuit and an anode, cathode and gate terminals; said anode-cathode circuit terminating at said anode and cathode terminals respectively; said gate-cathode circuit terminating at said gate and cathode terminals respectively; each of said plurality of series connected controlled rectifiers having a parallel connected resistor and a parallel connected capacitor in their anode-cathode circuit for distributing steady state and transient voltages between said plurality of series connected controlled rectifiers; and a pulse generating circuit connected to the gate-cathode circuit of each of said plurality of controlled rectifiers; said pulse generating circuit including a saturable reactor core having a primary and secondary winding for each of said controlled rectifiers; said primary windings being connected to a main pulse generator source; said secondary windings being connected in the gate-cathode circuit of their respective controlled rectifier; said primary windings being connected in series with one another; and first and second inductance means connected at the ends of said series connected primary windings to prevent transmission of a firing pulse to strings of series connected controlled rectifiers adjacent said plurality of controlled rectifiers.

12. A firing system for a plurality of series connected controlled rectifiers; each of said controlled rectifiers having an anode-cathode circuit, a gate-cathode circuit and an anode, cathode and gate terminals; said anode-cathode circuit terminating at said anode and cathode terminals respectively said gate-cathode circuit terminating at said gate and cathode terminals respectively; each of said plurality of series connected controlled rectifiers having a parallel connected resistor and a parallel connected capacitor in their anode-cathode circuit for distributing steady state and transient voltages between said plurality of series connected controlled rectifiers; and a pulse generating circuit connected to the gate-cathode circuit of each of said plurality of controlled rectifiers; said pulse generating circuit generating pulses to fire each of said rectifiers having a magnitude of at least 100 times the minimum magnitude of current required to fire any one of said plurality of controlled rectifiers; said parallel connected resistor and capacitor of each of said controlled rectifiers being connected to said controlled rectifier cathode and anode terminals by first and second current limiting resistors respectively; each of said controlled rectifiers and its respective resistor, capacitor, and one of said current limiting resistors being mounted as a respective subassembly on a conductive shielding element.

13. A firing system for a plurality of series connected controlled rectifiers; each of said controlled rectifiers having an anode-cathode circuit, a gate-cathode circuit and an anode, cathode and gate terminals; said anode-cathode circuit terminating at said anode and cathode terminals respectively; said gate-cathode circuit terminating at said gate and cathode terminals respectively; each of said plurality of series connected controlled rectifiers having a parallel connected resistor and a parallel connected capacitor in their anode-cathode circuit for distributing steady state and transient voltages between said plurality of series connected controlled rectifiers; and a pulse generating circuit connected to the gate-cathode circuit of each of said plurality of controlled rectifiers; said pulse generating circuit generating pulses to fire each of said rectifiers having a magnitude of at least 100 times the minimum magnitude of current required to fire any one of said plurality of controlled rectifiers; said parallel connected resistor and capacitor of each of said controlled rectifiers being connected to said controlled rectifier cathode and anode terminals by first and second current limiting resistors respectively; each of said controlled rectifiers having a respective gate protecting Zener diode connected across the gate-cathode circuit thereof.

14. A firing system for a plurality of series connected controlled rectifiers; each of said controlled rectifiers having an anode-cathode circuit, a gate-cathode circuit and an anode, cathode and gate terminals; said anode-cathode circuit terminating at said anode and cathode terminals respectively; said gate-cathode circuit terminating at said gate and cathode terminals respectively; each of said plurality of series connected controlled rectifiers having a parallel connected resistor and a parallel connected capacitor in their anode-cathode circuit for distributing steady state and transient voltages between said plurality of series connected controlled rectifiers; and a pulse generating circuit connected to the gate-cathode circuit of each of said plurality of controlled rectifiers; said pulse generating circuit generating pulses to fire each of said rectifiers having a magnitude of at least 100 times the minimum magnitude of current required to fire any one of said plurality of controlled rectifiers; said parallel connected resistor and capacitor of each of said controlled rectifiers being connected to said controlled rectifier cathode and anode terminals by first and second current limiting resistors respectively; each of said controlled rectifiers having a respective gate protecting Zener diode connected across the gate-cathode circuit thereof; each of said controlled rectifiers and its respective resistor, capacitor, Zener diode and one of said current limiting resistors being mounted as a respective subassembly on a conductive shielding element.

15. A pulse generating circuit comprising the combination of a voltage source, a controlled rectifier having an anode-cathode circuit and a gate-cathode circuit a current delay means, an output circuit and a firing means; said firing means connected to said gate-cathode circuit of said controlled rectifier, said voltage source, said output circuit, said current delay means, and the anode-cathode circuit of said controlled rectifier being connected in series; said current delay means delaying a rise in current beyond a predetermined value through said controlled rectifier after said controlled rectifier is fired until said controlled rectifier is substantially fully ionized.

16. A pulse generating circuit comprising the combination of a voltage source, a controlled rectifier having an anode-cathode circuit and a gate-cathode circuit, a current delay means, an output circuit and a firing means; said firing means connected to said gate-cathode circuit of said controlled rectifier, said voltage source, said output circuit, said current delay means, and the anode-cathode circuit of said controlled rectifier being connected in series; said current delay means delaying a rise in current beyond a predetermined value through said controlled rectifier after said controlled rectifier is fired until said controlled rectifier is substantially fully ionized; said delay means comprising a biased saturable reactor.

17. A pulse generating circuit comprising the combination of a voltage source, a controlled rectifier having an anode-cathode circuit and a gate-cathode circuit, a current delay means, an output circuit and a firing means; said firing means connected to said gate-cathode circuit of said controlled rectifier, said voltage source, said output circuit, said current delay means, and the anode-cathode circuit of said controlled rectifier being connected in series; said current delay means delaying a rise in current beyond a predetermined value through said controlled rectifier after said controlled rectifier is fired until said controlled rectifier is substantially fully ionized; said delay means comprising a biased saturable reactor; said output circuit including the primary winding of a saturable core; said primary winding of said saturable core having a higher magnetizing current than the magnetizing current of said saturable reactor.

18. A pulse generating circuit comprising the combination of a voltage source, a controlled rectifier having an anode-cathode circuit and a gate-cathode circuit, a current delay means, an output circuit and a firing means; said firing means connected to said gate-cathode circuit of said controlled rectifier, said voltage source, said output circuit, said current delay means, and the anode-cathode circuit of said controlled rectifier being connected in series; said current delay means delaying a rise in current beyond a predetermined value through said controlled rectifier after said controlled rectifier is fired until said controlled rectifier is substantially fully ionized; said delay means comprising a biased saturable reactor; said output circuit including the primary winding of a saturable core; said primary winding of said saturable core having a higher magnetizing current than the magnetizing current of said saturable reactor; said saturable reactor saturating in the order of 2 microseconds after firing of said controlled rectifier.

19. A pulse generating circuit comprising the combination of a voltage source, a controlled rectifier having an anode-cathode circuit and a gate-cathode circuit, a current delay means, an output circuit and a firing means; said firing means connected to said gate-cathode circuit of said controlled rectifier, said voltage source, said output circuit, said current delay means, and the anode-cathode circuit of said controlled rectifier being connected in series; said current delay means delaying a rise in current beyond a predetermined value through said controlled rectifier after said controlled rectifier is fired until said controlled rectifier is substantially fully ionized; said voltage source including a capacitor charged to a predetermined voltage.

References Cited by the Examiner

UNITED STATES PATENTS

| | | | |
|---|---|---|---|
| 2,773,184 | 12/1956 | Rolf | 307—88.5 |
| 3,049,642 | 8/1962 | Quinn | 307—88.5 |

OTHER REFERENCES

GE Silicon Controlled Rectifier Manual, 2nd Edition, copyright December 1961, pages 77 to 79.

ARTHUR GAUSS, *Primary Examiner.*

J. ZAZWORSKY, *Assistant Examiner.*